United States Patent [19]

Tanaka

[11] Patent Number: 4,973,510
[45] Date of Patent: Nov. 27, 1990

[54] COATED SHEET MATERIAL AND PROCESS FOR PRODUCING SAME

[75] Inventor: Kunio Tanaka, Ibaraki, Japan

[73] Assignee: Teijin Limited, Osaka, Japan

[21] Appl. No.: 235,690

[22] Filed: Aug. 23, 1988

[30] Foreign Application Priority Data

Sep. 2, 1987 [JP] Japan .................................. 62-218034
Oct. 21, 1987 [JP] Japan .................................. 62-263935

[51] Int. Cl.$^5$ .............................................. B32B 7/00
[52] U.S. Cl. ................................... 428/212; 427/393.4; 427/412; 428/213; 428/252; 428/266; 428/297; 428/447; 428/913
[58] Field of Search ............... 428/913, 252, 266, 297, 428/447, 212, 213; 427/393.4, 412

[56] References Cited

U.S. PATENT DOCUMENTS 3,485,661 12/1969 Campbell et al. ................. 117/138.8
4,661,116 4/1987 Barwick III, et al. .............. 428/246

FOREIGN PATENT DOCUMENTS 0067375 12/1982 European Pat. Off. .
8908555 9/1989 PCT Int'l Appl. .

Primary Examiner—James J. Bell
Attorney, Agent, or Firm—Burgess, Ryan & Wayne

[57] ABSTRACT

A light sheet material for a paraglider having an excellent tear strength and weather resistance comprises a polyester fiber woven fabric substrate impregnated with a waterproofing agent and a coating layer formed on the substrate and consisting essentially of a polysiloxane-modified polyurethane resin.

13 Claims, 1 Drawing Sheet

COATED SHEET MATERIAL AND PROCESS FOR PRODUCING SAME

BACKGROUND OF THE INVENTION (1) Field of the Invention

The present invention relates to a coated sheet material and a process for producing same. More particularly, the present invention relates to a coated sheet material which can be used for a paraglider and a spinnaker, and a process for producing same.

(2) Description of the Related Art

Recently, paragliding has become tremendously popular, because anyone is able to fly thereby. For example, after climbing to the top of a high mountain it is easy and thrilling to come down again by paragliding.

A paraglider has the following indispensable features.

First, the paraglider must be safe, and therefore, must gave a guaranteed high and durable mechanical strength, for example, seam strength and tear strength of the sheet material from which the paraglider is made, for normal use thereof.

Second: the paraglider must be light weight, as a light weight effectively enhances the flying property of the paraglider and makes it easily portable.

Third, the paraglider must be waterproof. Namely, it must hot absorb rain water, which would increase the weight thereof.

Additionally, the paraglider must be made from a sheet material having a satisfactory surface smoothness, color fastness, and dimensional stability.

The paraglider has been developed from a conventional parachute, which is usually made of a nylon fiber fabric as described in, for example, Japanese Unexamined Patent Publication No. 54-49799. Also, the nylon fiber fabric for forming the conventional parachute is coated with a known coating polymer material. This coating polymer material usually comprises a polyurethane resin and has a high weather resistance.

Conventional paragliders do not always satisfy all of the above-mentioned indispensable features, especially a high mechanical durability and a light weight. Namely, some conventional paragliders have an unsatisfactory heavy weight when carried, and thus are not easy to haul over a long distance or when climbing to a high position.

Also, to obtain a paraglider having a high mechanical strength and durability, the paraglider is necessarily made from a woven fabric which comprises a number of thick yarns or which has high weaving density.

The use of the thick yarns and the high weaving density makes the paraglider very heavy.

Further, the conventional nylon fiber fabrics for a paraglider are wetted by rain or mist, thus resulting in an increase in the weight of the paraglider and a formation of wrinkles on the surface of the paraglider, thereby adversely affecting the surface smoothness of the paraglider, and thus harming the flying properties and stability of the paraglider.

SUMMARY OF THE INVENTION

An object of the present invention is to provide a coated sheet material which can be used for a paraglider and a spinnaker, and having a light weight, an excellent mechanical strength, for example, tear strength, a very low water-absorbing property, a satisfactory surface smoothness and weather resistance, and a process for producing same.

The above-mentioned object can be attained by the coated sheet material of the present invention, which comprises a substrate consisting of a polyester fiber woven fabric impregnated with a waterproofing agent and a coating layer formed on the waterproof substrate and consisting essentially of a polysiloxane-modified polyurethane resin.

The coated sheet material can be produced by the process of the present invention, which comprises the steps of impregnating a substrate consisting of a polyester fiber woven fabric with a waterproofing agent and coating the resultant waterproof substrate with a polysiloxane-modified polyurethane resin.

DESCRIPTION OF THE PREFERRED EMBODIMENTS

Figure 1:
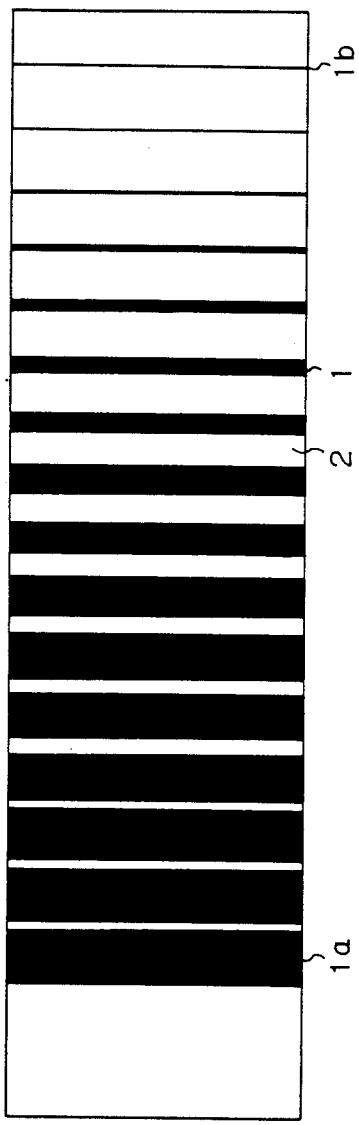
FIG. 1 shows an example of stripe patterns formed on the coated sheet material of the present invention; and, FIG. 2 shows another example of the stripe patterns formed on the coated sheet material of the present invention.

The coated sheet material of the present invention comprises a substrate, a waterproofing agent with which the substrate is impregnated, and a coating layer formed on the waterproof substrate.

The substrate consists of a polyester fiber woven fabric. Preferably, the woven fabric is composed of a number of polyester fiber yarns having a denier of 10 to 50 and consisting of individual polyester fibers having a denier f 0.5 to 20 and a tensile strength of 5 g/d or more, more preferably 7 g/d or more. The individual polyester fibers preferably have an ultimate elongation of 10% to 40%, more preferably 15% to 25%.

The polyester fiber yarn preferably has a total denier of from 25 to 40.

The polyester fiber is preferably made from a polyalkylene terephthalate, for example, polyethyleneterephthalate and polypropylene terephthalate, and polybutylene terephthalate.

Also, the polyester fiber may be made from a cationic dye-dyable modified polyester copolymer, for example, containing, as a copolymerization component, 5'-(alkali-metal sulfo)isophthalate.

The polyester fiber may contain a coloring pigment. Also, the polyester fiber yarns may be dyed before weaving.

The dyed or non-dyed polyester fiber yarns are woven into a fabric in usual manner.

The weaving structures of the woven fabric are not specifically limited, but preferably the woven fabric has a plain weave structure or a plain dobby weave structure, and a warp density of 100 to 150 yarns/inch and a weft density of 90 to 140 yarns/inch.

Preferably, the woven fabric substrate has a specific rip-stopping structure.

The woven fabric may be composed of two or more types of polyester fiber yarns having a different thickness, physical properties, dyeing property and/or color.

The substrate is impregnated with a waterproofing agent. For example, the waterproofing agent usable for the present invention comprises, as a principal component, at least one member selected from perfluorocarbon compounds, ethylene-urea compounds, alkylurea compounds, triazine compounds, and fatty acid zirconium salt compounds.

The amount of the waterproofing agent to be impregnated in the substrate is not limited to a specific level, but preferably the waterproofing agent is impregnated in the substrate to an extent such that the degree of water-repellency of the resultant waterproof substrate as on the level of 80 to 100 degrees.

Preferably, the waterproofing agent is in a dry content of 1% to 10% based on the weight of the substrate.

The impregnation of the substrate with the waterproofing agent can be carried out by a conventional method, for example, dipping or spraying.

In the coated sheet material of the present invention, a coating layer is formed on a surface of the waterproof substrate. The coating layer consists essentially of a polysiloxane-modified polyurethane resin. This modified resin can be prepared by reacting a siloxane polymer having hydroxyl radicals located at terminals of the Polymer molecules thereof with an organic isocyanate compound and a diol compound for a polyurethane. The modified resin may be prepared by reacting the siloxane polymer having hydroxyl radicals located at terminals of the polymer molecules thereof with a polyurethane.

The isocyanate compound may be selected from hexamethylene diisocyanate and isophorone diisocyanate.

The diol compound may be selected from polytetramethylene glycol, polyether diols, lactone-open ring diols and polycarbonate diols.

The specific siloxane polymer having terminal hydroxyl radical preferably consists of a straight molecular chain and has a molecular weight of 500 to 5000, and may be selected from alcohol-modified silicones and amino-modified silicones, for example, of

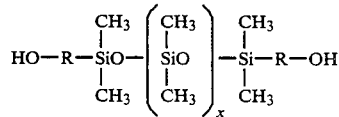

and,

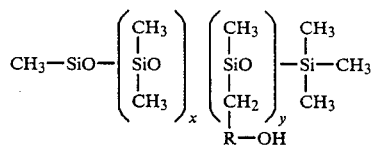

In the polysiloxane-modified polyurethane resin, the content of the siloxane polymer component reacted with the polyurethane component is preferably in the range of 10% to 30% based on the total weight of the modified resin.

Preferably, the polysiloxane-modified polymethane resin has a softening point of from 50° C. to 150° C. The coating layer preferably has a thickness of 2 to 20 μm, more preferably 3 to 15 μm.

When the thickness of the coating layer is less than 2 μm, the resultant sheet material sometimes exhibits an unsatisfactorily large permeability to air 7 and water. Also, a large thickness of the coating layer of more than 20 μm sometimes results in an undesirable large weight of the sheet material.

The sheet material of the present invention may have a stripe pattern, wherein the stripes extend in parallel to each other in a warp or weft direction.

The stripes can be formed by two types of fiber yarns each having a different color. The colored fibers can be produced from polymer pellets or a polymer dope colored with a pigment. The colored fiber yarns can be produced by dyeing colorless fiber yarns with a dye, for example, a dispense dye for usual polyester fiber yarns or a cationic dye for cationic dye-soluble fiber yarns.

In the formation of a stripe pattern in the polyester fiber fabric, a group of colored yarns are arranged in parallel to each other in the warp or weft direction to form a stripe and another group of different colored or colorless yarns are arranged adjacent to the above-mentioned group of the colored yarns and in parallel to each other to form a non-stripe portion adjacent to the stripe portion.

In the polyester fiber fabric, a plurality of colored stripes may be extended in parallel, and have a different width thereof, to each other in such a manner that the larger the width of the stripes, the smaller the intervals between the stripes. This pattern of stripes is such that, when observed from a far distance, the color appears to continuously and gradually change from dark to light through gradated tones.

Referring to FIG. 1, the pattern of stripes is composed of a number of stripes 1 extending in parallel to each other and spaced from each other by non-stripe portions 2.

In FIG. 1, the leftmost stripe 1a has a largest width and the rightmost stripe 1b has a smallest width. The widths of the stripes 1 and the non-stripe portions 2 are adjusted so that the larger the width of the stripe, the smaller the width of the non-stripe portion adjacent to the stripe.

When observed by the naked eye, this pattern of stripes of FIG. 1 appears to show that the color of the sheet material continuously changes from a dark color at the leftside to a light color at the rightside, through gradated tones.

The pattern of stripes indicated in FIG. 1 can be provided, for example, by forming the stripes 1 of cationic dye-dyable polyester fiber yarns (A) having a yarn count of 40,denier/20 filaments at a density of 100 yarns/inch, forming the non-stripe portions 2 of ordinary (cationic dye-undyeable) polyester filament yarns (B) having a yarn count of 40 denier/20 filaments at a density of 100 yarns/inch, and selectively dyeing the cationic dye-dyeable yarn (A) with a cationic dye.

The widths of the stripes 1 and the non-stripe portions 2 are changed in accordance with a predetermined pattern, by changing the numbers of the cationic dye-dyeable yarns (A) in the stripes 1 and the ordinary yarns B) in the non-stripe portions 2, for example, in the following manner (in the direction of from the left to the right of the drawing),

| 94 yarns (A) | 6 yarns (B)  | 88 yarns (A) |
| 12 yarns (B) | 82 yarns (A) | 18 yarns (B) |
| 10 yarns (A) | 40 yarns (B) | 4 yarns (A)  |
| 96 yarns (B) |              |              |

Figure 2:
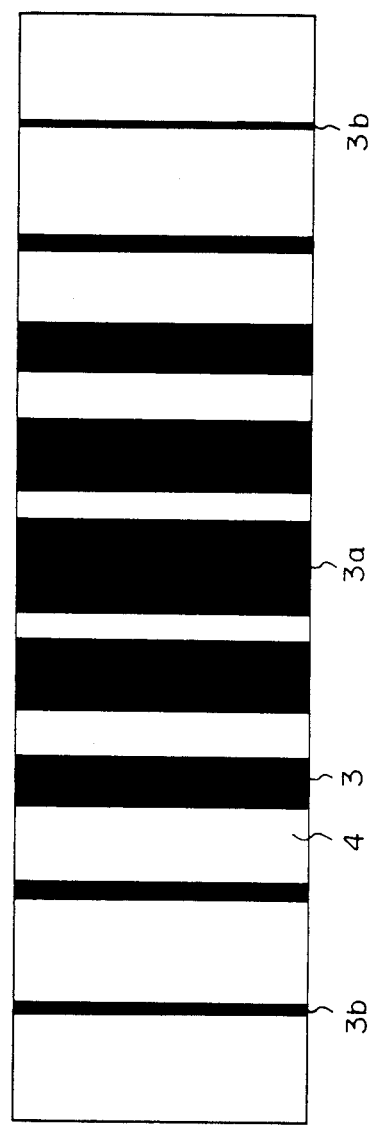

FIG. 2 shows another pattern of stripes formed by a plurality of stripes spaced by non-stripe portions 4. In FIG. 2, a wider stripe 3a is located in a central portion of the fabric and thinnest stripes 3b are located at the outermost portions of the fabric. In this pattern, the larger the width of the stripes 3, the smaller the width of the non-stripe portions adjacent to the stripes.

In the provision of the patterned fabric shown in FIG. 2, the stripes 3 are formed from cationic dye-dyeable polyester filament yarns (C) having a yarn count of 30 denier/12 filaments at a density of 130 yarns/inch, and the non-stripe portions 4 are formed from ordinary (cationic dye-undyeable) polyester filament yarns (D) having a yarn count of 30 denier/12 filaments at a density of 130 yarns/inch, for example, in the following arrangement of

|   |   | 110 yarns (D) |   |   |
|---|---|---|---|---|
| 20 yarns (C) | 90 yarns (D) | 40 yarns (C) | 70 yarns (D) | |
| 60 yarns (C) | 50 yarns (D) | 80 yarns (C) | 30 yarns (D) | |
| 100 yarns (C) | 30 yarns (D) | 80 yarns (C) | 50 yarns (D) | |
| 60 yarns (C) | 70 yarns (D) | 40 yarns (C) | 90 yarns (D) | |
| 20 yarns (C) | 110 yarns (D) | | | |

The non-stripe portions may be colorless or colored in a different color hue or darkness from that of the stripes.

The pattern of stripes shown in FIGS. 1 and 2 have the following advantages.

1. When observed closely, the sheet material shows a specific stripe pattern.

2. When observed from a far distance, the sheet material shows a specific continuous change in color from one side to the other side or from a center to outside portions of the sheet material, through graduated tones.

3. By forming the stripes with cationic dye-dyeable polyester yarns and the non-stripe portions with ordinary polyester yarns, the colored stripes can be formed by selectively dyeing the cationic dye-dyeable yarns in the fabric in one dyeing operation, and accordingly, the dyeing cost can be reduced.

4. The stripes can be formed in any patterns.

Generally, the sheet material of the present invention exhibits the following advantages.

1. The sheet material of the present invention has a significantly increased tear strength, and accordingly, a sheet material having a high mechanical strength can be formed by using yarns having a smaller denier than that cf a conventional sheet. Therefore, the resultant sheet material has a reduced weight.

2. The sheet material of the present invention exhibits an excellent and waterproof property, and thus, even during a rain storm, the weight of a paraglider made of the sheet material of the present invention is not increased, and the paraglider can still exhibit a stable flying property.

3. The sheet material of the present invention exhibits satisfactory weather resistance and is durable over a long period.

The present invention will be further explained by way of specific examples, which, however, are representative and do not restrict the scope of the present invention in any way.

EXAMPLE 1

A plain weave was produced from polyethylene terephthalate filament yarns having a yarn count of 40 denier/20 filaments and a denier of individual filament of 2 at a warp density of 119 yarns/inch and a weft density of 110 yarns/inch.

The plain leave was continuously desized and scoured by an ordinary method at a scouring temperature of 95° C. for 2 minutes and then pre-heat set at a temperatures of 300° C.

The pre-heat set fabric was dyed blue color with a disperse dye (trademark: Resoline Blue FBL) in an amount of 0.5% based on the weight of the fabric, at a temperature of 130° C. for one hour in a dyeing liquid-circulating type dyeing machine by an ordinary dyeing method. The dyed fabric was dried by using a non-touch drying machine at a temperature of 120° C. for one minute.

The dried fabric was impregnated with a waterproofing agent solution having the following composition, by an ordinary padding method

| Composition | |
|---|---|
| Component | Amount |
| Fluorin compound-containing Waterproofing agent (Trademark: Asahiguard 610, made by Asahi Glass) | 30 g/l |
| Mineral turpentine | 9.70 g/l |

The impregnated fabric was dried and heat-treated at a temperature of 180° C. for 45 seconds. The resultant waterproof fabric contained 0.2 g/m² by dry weight of the waterproofing agent.

The waterproof fabric was coated with 8 g/m² of the resin paste having the following composition by an ordinary doctor coating method.

| Composition | |
|---|---|
| Component | Amount (parts of weight) |
| Polysiloxane-modified polyurethane resin (Trademark: Lackskin UZ-803, made by Seiko Kasei Co.) | 100 |
| Addition product of hexamethyleneisocyanate with trimethylolpropane (Trademark: Colonate HL, made by Nihon Shokubai) | 3 |
| Toluene | 80 |
| Dimethylformamide | 10 |
| Total | 193 |

The coated fabric was dried and heat-treated at a temperature of 150° C. for 45 seconds.

The resultant coated sheet material had a dry coating layer of 8 g/m² and exhibited the tear strength, tensile strength, and waterproof property shown in Table 1.

The tear strength was determined in accordance with Japanese Industrial Standard (JIS) L-1096-1979, by using a pendulum tear machine. The tensile strength was determined in accordance with the JIS L-1096-1979 strip method by using specimens having a width of 5 cm.

The waterproof property was tested by immersing specimens in water at room temperature for 30 minutes, and evaluated by observing the surface of the specimens.

Unwrinkled specimens were evaluated as good, and specimens having wrinkles formed on the surface thereof were evaluated as bad.

The resultant coated sheet material was further subjected to a weathering test in accordance with JIS L-1079-1979, by using a weathering tester at an artificial sunlight radiation temperature of 40° C. at a relative humidity of 65% at a black panel temperature of 63° C., for 200 hours, while spraying water onto the specimen for 18 minutes during every 120 minutes of radiation.

The tear strength and tensile strength of the specimen after the weathering test for 200 hours are shown in Table 2, in comparison with those before the weathering test.

COMPARATIVE EXAMPLE 1

The same procedures as those described in Example 1 were carried out except that the waterproof fabric was coated with the following resin composition.

| Component | Composition Part by weight |
|---|---|
| Fatty acid-type polyurethane (Trademark: Crisvon 2116-EL, made by Dainihon Ink Chemical) | 100 |
| Hexamethylene isocyanate (Trademark: Burnock DN-950, made by Dainihon Ink Chemical) | 3 |
| Dimethylformamide | 100 |
| Total | 203 |

The coated fabric was dried and heat-treated at a temperature of 150° C. for 45 seconds. The resultant coated sheet material had a dry coating layer of 8 g/m² and exhibited the properties shown in Table 1.

COMPARATIVE EXAMPLE 2

A comparative plain weave was produced from nylon 66 filament yarns having a yarn count of 30 denier/7 filaments at a warp density of 146 yarns/inch and weft density of 122 yarns/inch in a rip-stopping weaving structure.

The nylon 66 filament fabric was continuously scoured by an ordinary scouring method and pre-heat set at a temperature of 180° C. The scoured fabric was dyed blue with an acid dye (trademark: Kayanol Milling Blue 2RW) in an amount of 0.5% based on the weight of the fabric, by an ordinary dyeing method in a beam dyeing machine at a temperature of 98° C. for 2 hours.

The dyed fabric was dried by a cylinder drying machine at a temperature of 120° C.

The dried fabric was treated with the waterproofing agent and coated with a resin in the same manner as that described in Comparative Example 1.

The resultant coated sheet material had a dry coating layer of 8 g/m² and exhibited the properties shown in Tables 1 and 2.

TABLE 1

| Example No. | Weight (g/m²) | Tear strength (g) Warp | Tear strength (g) Weft | Tensile strength (kg/5 cm) Warp | Tensile strength (kg/5 cm) Weft | Waterproof property |
|---|---|---|---|---|---|---|
| Example 1 | 47 | 2800 | 2300 | 46 | 41 | Good |
| Comparative 1 | 47 | 990 | 680 | 48 | 36 | Good |
| Comparative 2 | 43 | 560 | 420 | 43 | 35 | Good |

TABLE 2

| | Tensile strength (kg/5 cm) | | | | Tear strength (kg) | | | |
|---|---|---|---|---|---|---|---|---|
| | Before weathering test | | After weathering test | | Before weathering test | | After weathering test | |
| Example No. | Warp | Weft | Warp | Weft | Wrap | Weft | Warp | Weft |
| Example 1 | 46 | 41 | 24 (52.2)*¹ | 21 (51.2) | 2800 | 2300 | 1480 (52.9) | 1220 (53) |
| Comparative Example 2 | 43 | 35 | 12 (27.9) | 8 (22.9) | 560 | 420 | 130 (23.2) | 78 (23.5) |

Note:
*¹... ratio (%) of strength of the specimen after testing to that before testing Tables 1 and 2 show that the coated sheet material of the present invention exhibited a very high tear strength, a satisfactory waterproof property, and an excellent weathering resistance. The comparative coated sheet material of Comparative Example 1 having a coating layer different from that of the present invention exhibited a poor tear strength.

The comparative coated sheet material of Comparative Example 2 using a nylon 66 filament fabric exhibited a poor tear strength and a very poor weathering resistance.

That is, when the coated sheet material of the present invention is used, the resultant paraglider or spinnaker exhibits a high tear resistance and a good weathering resistance, and thus an enhanced safety.

EXAMPLES 2 AND 3

A plain weave was produced from polyethylene terephthalate filament yarns having a yarn count of 30 denier/12 filaments and a denier of individual filament of 2.5 at a warp density of 134 yarns/inch and weft density of 116 yarns/inch.

The fabric was scoured, pre-heat set, dyed, and dried in the same manner as described in Example 1.

The dried fabric was impregnated with a waterproofing agent solution having the following composition.

| Component | Composition Part by weight |
|---|---|
| Asahi Guard 610 | 10 |
| A mixture of H-silicone with dimethylsilicone (Trademark: Poloncoat E, made by Shinetsu Chemical) | 10 |
| Catalyst PC (organic metal salt catalyst made by Shinetsu chemical) | 0.05 |
| Catalyst PD (Coupling agent, made by Shinetsu chemical) | 0.05 |
| Mineral turpentine | 100 |
| Total | 120.1 |

In Example 2, the resultant waterproof fabric was first coated with the following composition

| Composition | |
|---|---|
| Component | Part by weight |
| Crisvon 2116EL | 100 |
| Burnock DN950 | 3 |
| Dimethylformamide | 100 |
| Total | 203 |

In Example 3, the waterproof fabric was coated with the following composition.

| Composition | |
|---|---|
| Component | Part by weight |
| Polysiloxane-modified polyurethane resin | 100 |
| Coronate HL | 3 |
| Toluene | 80 |
| Dimethylformamide | 10 |
| Total | 193 |

The resultant coated sheet materials of Examples 2 and 3 had a dry coating layer of 8 g/m$^2$ and exhibited the properties shown in Table 3.

COMPARATIVE EXAMPLE 3

The same procedures as those described in Example 2 were carried out except that the impregnation of the polyester filament fabric with the waterproofing agent was omitted.

The resultant coated sheet material had the properties shown in Table 3

COMPARATIVE EXAMPLE 4

The same procedures as those described in Comparative Example 3 were carried and except that the polyester filament fabric was replaced by the same nylon 66 filament fabric as described in Comparative Example 3.

The resultant coated sheet material had the properties shown in Table 3.

TABLE 3

| Example No. | Weight (g/m$^2$) | Tear strength (g) Warp | Weft | Tensile strength (kg/5 cm) Warp | Weft |
|---|---|---|---|---|---|
| Example 2 | 42 | 2220 | 1600 | 48 | 41 |
| 3 | 43 | 2560 | 1780 | 49 | 42 |
| Comparative Example 3 | 43 | 610 | 550 | 47 | 39 |
| 4 | 41 | 560 | 420 | 43 | 35 |

EXAMPLES 4 AND 5

In each of Examples 4 and 5, a plain leave fabric was produced from cationic dye-dyeable polyester filament yarns having a yarn count of 40 denier/16 filaments and a denier of individual filament of 2.5 at a warp density of 134 yarns/25.4 mm and 116 yarns/25.4 mm.

The fabric was continuously scoured at a temperature of 95° C. for 2 minutes and pre-heat set at a temperature of 200° C. by ordinary scouring and pre-heat setting methods.

The pre-heat set fabric was dyed blue with the following dyeing solution under the following conditions.

| Component | Amount |
|---|---|
| Dyeing solution | |
| Kayacryl Blue GSL-ED (CI B-54, made by Nihon Kayaku) | 2.0% owf |
| Nikkasan solt (Levelling agent, made by Nikka Kagaku) | 0.5 g/l |
| Acetic acid | 1.0 g/l |
| Na$_2$SO$_4$ | 5.0 g/l |
| Dyeing conditions | |
| Temperature | 120° C. |
| Time | 45 minutes |
| Liquor ratio | 1:15 |

The dyed fabric was dried at a temperature of 120° C. for one minutes, by a dryer.

The dried fabric was impregnated with the following waterproofing agent-containing liquid.

| Composition | |
|---|---|
| Component | Part by weight |
| Asahiguard 610 | 10 |
| Poloncoat E | 5 |
| Cat PC | 0.05 |
| Cat PD | 0.05 |
| Mineral turpentine | 100 |
| Total | 115.1 |

The impregnated fabric was dried and cured at a temperature of 150° C. for 45 seconds.

The cured fabric contained a dry weight of 0.2 g/m$^2$ of the waterproofing agent In Example 4, a portion of the resultant waterproof fabric was coated with the following resin composition (A).

| Resin Composition (A) | |
|---|---|
| Component | Part by weight |
| Crisvon 2116EL | 100 |
| Burnock DN950 | 3 |
| Dimethylformamide | 100 |
| Total | 203 |

The coated fabric was dried and cured at a temperature of 150° C. for 45 seconds.

The resultant coated sheet material had a dry coating layer of 8 g/m$^2$.

In Example 5, another portion of the waterproof fabric was coated with the following resin composition (B).

| Resin Composition (B) | |
|---|---|
| Component | Parts by weight |
| Polysiloxane-modified polymethane resin | 100 |
| Coronate HL | 3 |
| Toluene | 80 |
| Dimethylformamide | 10 |
| Total | 193 |

The coated fabric was dried and cured at a temperature of 150° C. for 45 seconds.

The resultant coated sheet material had a dry coating layer of 8 g/m$^2$.

The properties of the coated sheet materials of Examples 4 and 5 are shown in Table 4.

COMPARATIVE EXAMPLE 5

A plain weave fabric was produced from polyethylene terephthalate filament yarns having a yarn count of 40 denier/16 filaments and an individual filament denier of 2.5 at the same warp and weft densities as described in Examples 4 and 5.

The fabric was scoured and pre-heat set in the same manner as in Examples 4 and 5.

The pre-heat set fabric was dyed blue with the following dyeing liquid under the following conditions.

| Component | Amount |
| --- | --- |
| Dyeing liquid | |
| Resoline Blue FBL (CI B-56, made by Bayel) | 1.5% owf |
| Nikkasan solt RSD (Levelling agent made by Nikka Kagaku) | 0.5 g/l |
| Acetic acid | 1.0 g/l |
| Dyeing conditions | |
| Temperature | 130° C. |
| Time | 45 minutes |
| Liquor ratio | 1:15 |

The dyed fabric was dried at a temperature of 120° C. for one minute, in a dryer.

The dried fabric was directly coated with the following resin composition (C), without waterproofing.

| Resin Composition (C) | |
| --- | --- |
| Component | Part by weight |
| Crisvon 2116EL | 100 |
| Burnock DN950 | 3 |
| Dimethylformamide | 100 |
| Total | 203 |

The resultant coated sheet material had a dry coating layer of 8 g/m² and exhibited the properties indicated in Table 4.

COMPARATIVE EXAMPLES 6 AND 7

In each of Comparative Examples 6 and 7, a plain weave fabric was produced from nylon 66 filament yarns having a yarn count of 30 denier/12 filaments and a individual filament denier of 2.5 at a warp density of 146 yarns/25.4 mm and a weft density of 122 yarns/25.4 mm.

The fabric was scoured and pre-heat set by an ordinary method. The pre-heat set fabric was dyed blue with the following dyeing liquid under the following conditions.

| Dyeing liquid | Amount |
| --- | --- |
| Component | |
| Kayanol Milling Blue 2RW (CI B-140, made by Nihon Kayaku) | 2.0% owf |

| Dyeing liquid | Amount |
| --- | --- |
| Ammonium sulfate | 0.5 g/l |
| Acetic acid | 0.2 g/l |
| Newpon TS-400 (Levelling, agent made by Nikka Kagaku) | 2.0 owf |
| Dyeing conditions | |
| Temperature | 95° C. |
| Time | 45 minutes |
| Liquor ratio | 1:20 |
| Machine | Jigger |

The dyed fabric was dried at a temperature of 120° C. for one minute, by a non-touch drying machine.

The dried fabric was coated with the following waterproofing agent composition.

| Composition | |
| --- | --- |
| Component | Part by weight |
| Poloncoat E | 5 |
| Cat PC | 0.05 |
| Cat PD | 0.05 |
| Mineral turpentine | 100 |
| Total | 105.01 |

The resultant waterproof fabric contained 0.2 g/m² of the waterproofing agent.

In Comparative Example 6, a portion of the waterproof fabric was coated with the following composition.

| Resin Composition (D) | |
| --- | --- |
| Component | Part by weight |
| Crisvon 2116EL | 100 |
| Burnock DN950 | 3 |
| Dimethylformamide | 100 |
| Total | 203 |

The coated fabric was dried and cured at 150° C. for 45 seconds. The resultant coated sheet material had a dry coating layer of 8 g/m² and exhibited the properties shown in Table 4.

In Comparative Example 7, the other portion of the waterproof fabric was coated by the following composition.

| Resin Composition (E) | |
| --- | --- |
| Component | Part by weight |
| Polysiloxane-modified polyurethane resin | 100 |
| Coronate HL | 3 |
| Toluene | 80 |
| Dimethylformamide | 10 |
| Total | 193 |

The coated fabric was dried and cured at 150° C. for 45 seconds.

The resultant coated sheet material had a dry coating layer of 8 g/m² and exhibited the properties shown in Table 4.

TABLE 4

| | Coating resin composition | Weight (g/m²) | Coated sheet material | | | | | | | | | |
|---|---|---|---|---|---|---|---|---|---|---|---|---|
| | | | Tear strength (g) | | | | Tensile strength (kg/5 cm) | | Sublimation fastness in storage*² | | | |
| | | | Before weathering test | | After weathering test*¹ | | | | 20% RH | | 90% RH | |
| | | | Warp | Weft | Warp | Weft | Warp | Weft | Change in Color | Staining | Change in Color | Staining |
| Example 4 | A | 47 | 1850 | 1690 | 840 | 700 | 48 | 41 | 4-5 | 4-5 | 4-5 | 4 |
| 5 | B | 48 | 1810 | 1670 | 790 | 650 | 47 | 40 | 4-5 | 4-5 | 4-5 | 4 |
| Compar- 5 | C | 47 | 930 | 760 | 470 | 410 | 54 | 41 | 4-5 | 4 | 4 | 1 |
| ative 6 | D | 45 | 1850 | 1590 | 390 | 290 | 48 | 42 | 4-5 | 4-5 | 4-5 | 4 |
| Example 7 | E | 44 | 1700 | 1510 | 370 | 280 | 49 | 41 | 4-5 | 4-5 | 4-5 | 4 |

Note:
*¹200 hours
*²Storage at 70° C. for !% hours

EXAMPLE 6

A plain weave fabric was prepared from warps consisting of polyethylene terephthalate filament yarns having a yarn count of 40 denier/20 filaments at a warp density of 130 yarns/25.4 mm and wefts consisting of polyethylene terephthalate filament yarn (a) having a yarn count of 40 denier/20 filaments and cationic dye-dyable polyester fibers (b) having a yarn count of 40 denier filaments at a weft density of 100 yarns/25.4 mm.

In the weft, the yarns (a) and (b) were arranged as follows.

| | | | |
|---|---|---|---|
| 94 yarns (a) | 6 yarns (b) | 88 yarns (a) | 12 yarns (b) |
| 82 yarns (a) | 18 yarns (b) | 76 yarns (a) | 24 yarns (b) |
| 70 yarns (a) | 30 yarns (b) | 64 yarns (a) | 36 yarns (b) |
| 58 yarns (a) | 42 yarns (b) | 52 yarns (a) | 48 yarns (b) |
| 46 yarns (a) | 54 yarns (b) | 40 yarns (a) | 60 yarns (b) |
| 34 yarns (a) | 66 yarns (b) | 28 yarns (a) | 72 yarns (b) |
| 22 yarns (a) | 78 yarns (b) | 16 yarns (a) | 84 yarns (b) |
| 18 yarns (a) | 90 yarns (b) | 4 yarns (a) | 96 yarns (b) |

The fabric was continuously scoured in a scouring aqueous solution containing 2 g/l of sodium carbonate and 2 g/l of scouring agent (trademark: Noigen, made by Daiichi Kogyo Seiyaku) at a temperature of 90° C. for 3 minutes. The scoured fabric was dried and pre-heat set at a temperature of 190° C. for one minute.

The fabric was dyed with the following dyeing liquid at a temperature of 125° C. for 45 minutes

| Dyeing liquid | |
|---|---|
| Component | Amount |
| Resoline Blue FBL (CI B-56, made by Bayer) | 0.5% owf |
| Kayacryl Blue GSL-60 (CI B-54, made by Nihon Kayaku) | 0.5% owf |
| Disper VG (levelling agent, made by Meisei Kagaku Co.) | 0.5 g/l |
| Na₂SO₄ | 2 g/l |
| Acetic acid | 0.2 ml/l |

The resultant dyed fabric had the pattern of stripes shown in FIG. 1.

The dyed fabric was impregnated and coated in the same manner as in Example 1.

The resultant coated sheet material exhibited a satisfactory mechanical strength, waterproof property, and weathering resistance.

EXAMPLE 7

The same procedures as those described in Example 9 were carried out, with the following exception.

In the preparation of the plain weave fabric, the warp was formed from polyethylene terephthalate filament yarns (c) having a yarn count of 30 denier/12 filaments and cationic dye-dyable polyester filament yarn (d) having a yarn count of 30 denier/12 filaments at a warp density of 130 yarns/25.4 mm and the weft was composed of polyethylene terephthalate filament yarns having a yarn count of 30 denier/12 filaments at a weft density of 120 yarns/25.4 mm.

In the warp, the yarns (c) and (d) were arranged as follows.

| | | | |
|---|---|---|---|
| 110 yarns (c) | 20 yarns (d) | 90 yarns (c) | 40 yarns (d) |
| 70 yarns (c) | 60 yarns (d) | 50 yarns (c) | 80 yarns (d) |
| 30 yarns (c) | 100 yarns (d) | | |

The above-mentioned yarn arrangement was repeated four times.

The resultant coated sheet material had a specific pattern of stripes and exhibited a satisfactory mechanical strength, waterproof property, and weathering resistance.

EXAMPLE 8

The same procedures as those described in Example 9 were carried out, except that in the weft of the fabric, ordinary polyester filament yarns were replaced by dope-colored blank polyester filament yarns having a yarn count of 30 denier/12 filaments, the fabric was scoured with the scouring aqueous solution at a temperature of 80° C. for 3 minutes, and the pre-heat setting was carried out at 190° C. for 2 minutes.

The pre-heat set fabric was dyed with the following dyeing solution at 125° C. for 45 minutes.

| Dyeing solution | |
|---|---|
| Component | Amount |
| Palanil Yellow 5G (CI Y-5, made by BASF) | 2.0% owf |
| Kayacryl pink B-ED (CI R-27, made by Nihon Kayaku) | 0.5% owf |
| Disper VG | 0.5 g/l |
| Na₂SO₄ | 3.0 g/l |
| Acetic acid | 0.2 g/l |

The resultant coated sheet material had a pattern of specific stripes and exhibited a satisfactory mechanical strength, waterproof property, and weathering resistance.

I claim:

1. A coated sheet material, comprising a substrate consisting essentially of a polyester fiber woven fabric impregnated with a waterproofing agent and a coating layer formed on the waterproof substrate said coating layer consisting essentially of a polysiloxane-modified polyurethane resin.

2. The sheet material as claimed in claim 1, wherein the woven fabric is composed of polyester fiber yarns each having a total denier of 10 to 50 and composed of the individual polyester fibers having a denier of 0.5 to 20 and a tensile strength of 5 g/d or more.

3. The sheet material as claimed in claim 1, wherein the waterproofing agent comprises at least one member selected from the group consisting of waterproofing perfluorocarbon compounds, ethylene-urea compounds, alkylurea compounds, triazine compounds and fatty acid-zirconium salt compounds.

4. The sheet material as claimed in claim 1, wherein the waterproofing agent is in a dry content of 5% to 40% based on the weight of the substrate.

5. The sheet material as claimed in claim 1, wherein the polysiloxane-modified polyurethane resin is a reaction product of a siloxane polymer having hydroxyl radicals located at terminals of the polymer molecules with a polytetramethylene glycol and an organic isocyanate.

6. The sheet material as claimed in claim 1, wherein the polysiloxane-modified polyurethane resin has a softening point of from 50° C. to 150° C.

7. The sheet material as claimed in claim 1, wherein the coating layer has an thickness of from 2 to 20 μm.

8. The sheet material as claimed in claim 1, wherein the woven fabric is composed of polyethylene terephthalate fibers.

9. The sheet material as claimed in claim 1, wherein the woven fabric is composed of cationic dye-dyeable polyester fibers.

10. The sheet material as claimed in claim 1, which has colored stripes extending in parallel to and different in width from each other and spaced from each other in such a manner that the larger the width of the stripes, the smaller the width of non-stripe portions between adjacent stripes.

11. A process for producing a sheet material for a paraglider, comprising impregnating a substrate consisting essentially of a polyester fiber woven fabric with a waterproofing agent, and coating the resultant waterproofed substrate with a polysiloxane-modified polyurethane resin.

12. The probes as claimed in claim 11, wherein the waterproof substrate is coated with a siloxane polymer having hydroxyl radicals located at terminals of polymer molecules thereof and then with a polyurethane resin to cause the siloxane polymer to react with the polyurethane resin to provide a polysiloxane-modified polyurethane resin on the waterproof substrate.

13. The process as claimed in claim 12, wherein the siloxane polymer has a molecular weight of 500 to 5000.

* * * * *